(12) United States Patent
Krishnapura

(10) Patent No.: US 9,842,211 B2
(45) Date of Patent: Dec. 12, 2017

(54) SYSTEMS AND METHODS FOR BIOMETRIC AUTHENTICATION

(71) Applicant: Synaptics Incorporated, San Jose, CA (US)

(72) Inventor: Rohini Krishnapura, San Jose, CA (US)

(73) Assignee: Synaptics Incorporated, San Jose, CA (US)

(*) Notice: Subject to any disclaimer, the term of this patent is extended or adjusted under 35 U.S.C. 154(b) by 105 days.

(21) Appl. No.: 14/925,879

(22) Filed: Oct. 28, 2015

(65) Prior Publication Data

US 2017/0124328 A1    May 4, 2017

(51) Int. Cl.
*G06F 21/32* (2013.01)
*G06F 21/57* (2013.01)

(52) U.S. Cl.
CPC ............. *G06F 21/57* (2013.01); *G06F 21/32* (2013.01); *G06F 2221/034* (2013.01)

(58) Field of Classification Search
CPC ..... G06F 21/32; G06F 21/57; G06F 2221/034
USPC .......................................................... 726/19
See application file for complete search history.

(56) References Cited

U.S. PATENT DOCUMENTS

| 2006/0167784 A1* | 7/2006 | Hoffberg | .............. | G06Q 20/401 |
| | | | | 705/37 |
| 2007/0087756 A1* | 4/2007 | Hoffberg | ............ | G06Q 10/0631 |
| | | | | 455/450 |
| 2010/0162386 A1 | 6/2010 | Li et al. | | |
| 2014/0137191 A1 | 5/2014 | Goldsmith et al. | | |
| 2014/0157401 A1 | 6/2014 | Alameh et al. | | |
| 2015/0033305 A1* | 1/2015 | Shear | ...................... | G06F 21/45 |
| | | | | 726/6 |

\* cited by examiner

*Primary Examiner* — Kambiz Zand
*Assistant Examiner* — Benjamin Kaplan
(74) *Attorney, Agent, or Firm* — Leydig, Voit & Mayer, Ltd.

(57) ABSTRACT

Systems and methods for determining a threat level are disclosed. A method includes: receiving, from a biometric sensor, data corresponding an attempt to verify an identity of a user; determining, based on the data corresponding to the attempt, one or more authentication parameters associated with the attempt; authenticating the user based on determining that a score associated with the attempt satisfies an authentication condition associated with a biometric template; after authenticating the user, determining one or more device usage parameters within a time window of authenticating the user; determining a threat level based on the one or more authentication parameters and the one or more device usage parameters; and, causing an action to be performed by the device in accordance with the threat level.

21 Claims, 5 Drawing Sheets

SYSTEMS AND METHODS FOR BIOMETRIC AUTHENTICATION

FIELD

This disclosure relates generally to the field of biometrics and, more specifically, to systems and methods for biometric authentication.

BACKGROUND

Since its inception, biometric sensing technology has revolutionized identification and authentication processes. The ability to capture and store biometric data in a digital file of minimal size has yielded immense benefits in fields such as law enforcement, forensics, and information security.

However, the widespread adoption of biometric sensing technology in a broad range of applications has faced a number of obstacles. When biometric sensing technology is used for authentication (for example, for unlocking a mobile device), the process is inherently noisy or imperfect. For example, if the biometric sensor is a fingerprint sensor, it is possible that another person (i.e., an "imposter") has a similar enough fingerprint to the fingerprint of the correct user so that the imposter is able to authenticate with his or her own fingerprint. This phenomenon is referred to as a "false acceptance." The rate at which false acceptance occurs for a given authentication scheme is referred to as the "false acceptance rate" (FAR). The rate at which false rejection occurs for a given authentication scheme is referred to as the "false rejection rate" (FRR).

In one conventional approach for testing a biometric authentication system for security purposes, biometric samples are pre-collected from a large set of users and the collected data are subsequently run through the biometric authentication system as an offline test to evaluate FAR/FRR. The results from these FAR/FRR tests are used to operate the biometric authentication system at an acceptable FAR and FRR. In another conventional approach, a set of users are enrolled on the device, and repeated biometric samples are successively provided to measure actual false rejections as a function of how many times the biometric system rejects the user to login or authenticate with the system. This is frequently termed as "live testing." One drawback of both database testing and live testing is that neither approach properly replicates the true interaction of the user with the biometric system in actual real world usage.

SUMMARY

One embodiment provides a device for determining a threat level, including a biometric sensor and a processing system. The processing system is configured to: receive, from the biometric sensor, data corresponding an attempt to verify an identity of a user; determine, based on the data corresponding to the attempt, one or more authentication parameters associated with the attempt; authenticate the user based on determining that a score associated with the attempt satisfies an authentication condition associated with a biometric template; after authenticating the user, determine one or more device usage parameters within a time window of authenticating the user; determine a threat level based on the one or more authentication parameters and the one or more device usage parameters; and, cause an action to be performed by the device in accordance with the threat level.

Other embodiments provide a method and computer-readable medium for determining a threat level. The method includes: receiving, from a biometric sensor, data corresponding an attempt to verify an identity of a user; determining, based on the data corresponding to the attempt, one or more authentication parameters associated with the attempt; authenticating the user based on determining that a score associated with the attempt satisfies an authentication condition associated with a biometric template; after authenticating the user, determining one or more device usage parameters within a time window of authenticating the user; determining a threat level based on the one or more authentication parameters and the one or more device usage parameters; and, causing an action to be performed by the device in accordance with the threat level.

DETAILED DESCRIPTION

Figure 1:
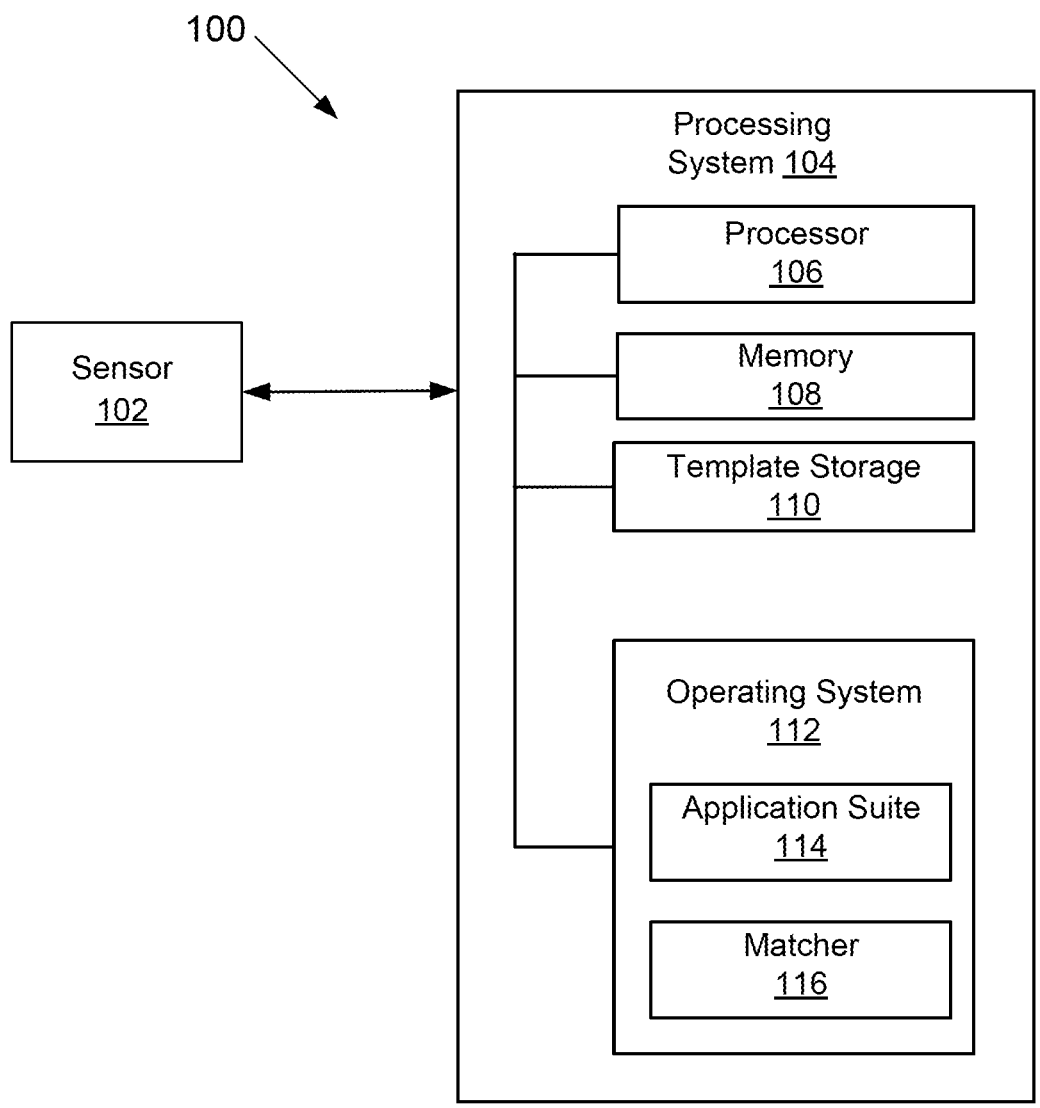
FIG. 1 is a block diagram of an example device that includes an input device and a processing system, in accordance with embodiments of the disclosure.

The following detailed description is merely exemplary in nature and is not intended to limit the disclosure or the application and uses of the disclosure. Furthermore, there is no intention to be bound by any expressed or implied theory presented in the preceding technical field, background, brief summary or the following detailed description. Embodiments of the disclosure provide systems and methods to use authentication patterns to determine a system threat level and improve the biometric authentication experience with the use of a biometric monitor.

According to embodiments of the disclosure, usage patterns surrounding an authentication attempt can be exploited to make the biometric authentication experience more user-friendly and also more secure. In some situations, a user may authenticate with a particular "purpose," such as to unlock a mobile device to check email or to unlock the mobile device to call someone. The particular "purpose" may be associated with patterns about who the user typically calls, what time of day the calls are placed, the location where the calls are placed, and the like. In addition to patterns that can be detected at the time of authentication, many users exhibit patterns in their activity on a device within a certain time window post authentication. Embodiments of the disclosure track authentication patterns, both during and after authentication, to determine a system threat level.

In some conventional approaches, a single authentication attempt involves measurements from only the biometric sensor at which an authentication decision is made. Embodiments of the disclosure expand the set of measurements made at the time that authentication is attempted to include the environment around the authentication attempt, among other criteria. This can be done with the use of a biometric system monitor software to capture the biometric information at that instant and/or for a limited time post authentication. These embodiments allow for more information to be combined by the biometric system monitor software to sense the system threat level.

As patterns begin to emerge over time, the biometric system monitor software can be used to raise or lower the system threat level based on the patterns exhibited during and post an authentication event, which allows for a more holistic experience to biometric authentication, where multiple sensors can be measured and information outside of biometric sensors can be used so that usage patterns can be exploited. The system threat level can be used for an overall improved authentication experience for that user, but also one that is more secure.

The disclosed system and method allows for an assessment of the threat level of the system, which can be used in several ways. For example, at times when threat level is assessed as high, the authentication threshold can be dynamically changed to increase the security setting, thereby improving the security of the system. At times when threat level is assessed as low, the authentication threshold can be dynamically changed to decrease the security setting to improve usability, i.e., by making it easier for the user to authenticate, less false rejections are received, which improve the user experience without negatively impacting overall system security.

According to various embodiments, a biometric authentication system has a security setting that is used to control the overall security of the system. A high security setting is desirable because of the risks of a hacker gaining access to personal or sensitive information.

However, since most devices that include biometric authentication systems, such as mobile phones or tablets, are becoming more personal, individual user experience becomes very important in addition to providing high security. Embodiments of the disclosure exploit the individual patterns exhibited by a user to improve usability, while maintaining high security. The usage patterns can be combined with the biometric sensor data and other data to determine a threat level for the system.

According to various embodiments, the threat level assessment of the system can then be used to (a) increase the system security setting (e.g., FAR/FRR threshold) when the threat level is high, (b) decrease the system security setting (e.g., FAR/FRR threshold) when the threat level is low, (c) send out a system alert or an application alert to, for example, halt payment systems or alert credit card systems to limit/control damage when threat level is high, or (d) encrypt or delete sensitive data when threat level is high, among other implementations that are also within the scope of the disclosure and described in greater detail herein.

As described, in some embodiments, an authentication attempt may happen with a "purpose." Examples include to login to the system after a period of inactivity to make a phone call, check email, or authenticate to make a payment. Most users are routine in nature and have a specific time of day for certain activities or periodic intervals for certain activities. Many users also exhibit patterns on what they buy or where they buy them. All such data, and more, is available on the system and can be combined with information provided by the biometric sensor to make a more intelligent assessment of a security threat.

For example, a typical usage pattern might show that a user logs into the system at certain times of the day (e.g., in the morning) and a specified location (e.g., when they login at work) or at predefined intervals (e.g., when the system times out during long periods of inactivity). These typical usage patterns exhibited by the user can be sensed and combined by the biometric system monitor software to make the system more user-friendly and also more secure.

According to various embodiments, the variables surrounding an authentication attempt can include so-called "authentication parameters" and/or "device usage parameters." Authentication parameters include "match parameters" and/or "sample parameters." Match parameters may be associated with a correlation between data corresponding to an authentication attempt and one or more biometric templates. Sample parameters may be associated with the data corresponding to the attempt itself. Device usage parameters may be associated with activities sensed by other components of the device at the time of authentication or within a time window after authentication.

Example match parameters include: the match outcome as either a success or failure, a measure of coverage between the data corresponding to the authentication attempt and the biometric template, a system authentication threshold and a match score relative to the authentication threshold, an indication of whether one or more minutiae points are included in the data corresponding to the authentication attempt, a measure of alignment between the data corresponding to the authentication attempt and the biometric template, an indication of which iris (i.e., left or right) was used to authenticate the user, an indication of which finger was used to authenticate the user, and an indication of localization information for the data corresponding to the authentication attempt, among others. The indication of localization information may comprise one or more of: an indication of which enrollment view of the biometric template was used to authenticate the user, an indication of a location within a particular enrollment view that is associated with the authentication attempt, and an indication of whether a core of a finger is included in the data corresponding to the authentication attempt, among others. In some implementations, multiple (e.g., smaller) enrollment views of a fingerprint are collected during the enrollment process and stitched together to comprise a collective (e.g., larger) view of the fingerprint. In some implementations, the multiple enrollment views are stored separately, along with the geometric relationships between the views.

Example sample parameters include: a measure of image quality of the data corresponding to the authentication attempt, a measure of moistness corresponding to the data corresponding to the authentication attempt, an indication of whether a full or partial image of the biometric was captured, which is a percentage of biometric data captured with the authentication attempt against the biometric sensor's field of view, among others.

Example device usage parameters include: a time of day associated with the attempt to verify the identity of the user, a geographic location associated with the attempt to verify the identity of the user, data corresponding to which one or more programs (e.g., email app, browser app, messaging app, etc.) are opened on the device within a time window after authenticating the user, data corresponding to one or more gestures made on the device within a time window after authenticating the user, data corresponding to which parts of a screen were touched on the device within a time window after authenticating the user, and data corresponding to ambient sounds detected by the device within a time window after authenticating the user, ambient video or images captured by a camera within a time window after authentication, among others.

According to some embodiments, the biometric system monitor software is a background process that interacts with matcher software to gather data and statistics about the authentication attempt and also the ambient information from the system during and post authentication. In some embodiments, the authentication events are associated with time. A time series analysis can be conducted to detect patterns in the authentication. When patterns are detected, they are marked with an associated strength in the pattern. Certain patterns are strong, such that a missed event associated with a strong pattern may carry more weight in determining the system threat level versus a weak pattern that may have a lower weight when missed. According to some embodiments, the strength of particular patterns may increase over time.

Turning now to the figures, FIG. 1 is a block diagram of an electronic system or electronic device 100 that includes an input device, such as sensor 102, and processing system 104, in accordance with an embodiment of the disclosure. As used in this document, the term "electronic system" (or "electronic device") broadly refers to any system capable of electronically processing information. Some non-limiting examples of electronic systems include personal computers of all sizes and shapes, such as desktop computers, laptop computers, netbook computers, tablets, web browsers, e-book readers, and personal digital assistants (PDAs). Additional example electronic devices include composite input devices, such as physical keyboards and separate joysticks or key switches. Further example electronic systems include peripherals such as data input devices (including remote controls and mice), and data output devices (including display screens and printers). Other examples include remote terminals, kiosks, and video game machines (e.g., video game consoles, portable gaming devices, and the like). Other examples include communication devices (including cellular phones, such as smart phones), and media devices (including recorders, editors, and players such as televisions, set-top boxes, music players, digital photo frames, and digital cameras). Additionally, the electronic device 100 could be a host or a slave to the sensor 102.

Sensor 102 can be implemented as a physical part of the electronic device 100, or can be physically separate from the electronic device 100. As appropriate, the sensor 102 may communicate with parts of the electronic device 100 using any one or more of the following: buses, networks, and other wired or wireless interconnections. Examples include I2C, SPI, PS/2, Universal Serial Bus (USB), Bluetooth, RF, and IRDA.

In some embodiments, sensor 102 will be utilized as a fingerprint sensor utilizing one or more various electronic fingerprint sensing methods, techniques and devices to capture a fingerprint image of a user. In other embodiments, others type of biometric sensors or input devices may be utilized instead of or in addition to the fingerprint sensor to capture a biometric sample. For instance, input devices that capture other biometric data such as faces, vein patterns, voice patterns, hand writing, keystroke patterns, heel prints, body shape, and/or eye patterns, such as retina patterns, iris patterns, and eye vein patterns may be utilized. For ease of description, biometric data discussed herein will be in reference to fingerprint data. However, any other type of biometric data could be utilized instead of or in addition to the fingerprint data.

Generally, fingerprint sensor 102 may utilize any type of technology to capture a user's fingerprint. For example, in certain embodiments, the fingerprint sensor 102 may be an optical, capacitive, thermal, pressure, radio frequency (RF) or ultrasonic sensor. Optical sensors may utilize visible or invisible light to capture a digital image. Some optical sensors may use a light source to illuminate a user's finger while utilizing a detector array, such as a charge-coupled device (CCD) or CMOS image sensor array, to capture an image.

Regarding capacitive sensors, capacitive sensing technologies include two types: passive and active. Both types of capacitive technologies can utilize similar principles of capacitance changes to generate fingerprint images. Passive capacitive technology typically utilizes a linear one-dimensional (1D) or a two-dimensional (2D) array of plates (i.e., electrodes or traces) to apply an electrical signal, e.g., in the form of an electrical field, such as a varying high speed (RF or the like) signal transmitted to the finger of the user from a transmitter trace and received at a receiver trace after passage through the finger. A variation in the signal caused by the impedance of the finger indicates, e.g., whether there is a fingerprint valley or ridge between the transmitter trace and the receiver trace in the vicinity of where the transmission and reception between the traces occurs. Fingerprint ridges, as an example, can typically display far less impedance (lower capacitance across the gap) than valleys, which may exhibit relatively high impedance (higher capacitance across the gap). The gaps can be between traces on the same plane, horizontal, vertical or in different planes.

Active capacitive technology is similar to passive technology, but may involve initial excitation of the epidermal skin layer of the finger by applying a current or voltage directly to the finger. Typically, thereafter, the actual change in capacitance between the source of the voltage or current on an excitation electrode (trace) and another receptor electrode (trace) is measured to determine the presence of a valley or ridge intermediate the source electrode and the another receptor electrode.

In some embodiments of the capacitive sensor, the traces may form a plurality of transmitter electrodes and a single receiver electrode or a plurality of receiver electrodes and a single transmitter electrode arranged in a linear one dimensional capacitive gap array. In such embodiments, the capacitive gap may be horizontal across the gap formed by the respective ends of the plurality of traces and the single trace, whether transmitter or receiver.

In some embodiments of the capacitive sensor, the traces may form a 2D grid array, e.g., with rows of transmitter/receiver traces on one substrate and columns of receiver/transmitter traces on the same or a separate substrate, e.g., laminated together with some form of dielectric between the traces to form a 2D sensor element array. A 2D array may also be formed using a 2D matrix of sensing electrodes. Such 2D arrays may form a 2D placement sensor array (also sometimes known as an "area sensor" or "touch sensor") or a 2D swipe sensor array (also sometimes known as a "slide sensor"). A swipe sensor may also be formed from a one or more 1D arrays or linear arrays.

Regarding thermal sensors, when a finger is presented to a thermal sensor, the fingerprint ridges make contact with the sensor surface and the contact temperature is measured. The ridges contact the sensor and yield a temperature measurement, while the valleys do not make contact and are not measured beyond some captured ambient noise. A fingerprint image is created by the skin-temperature of the ridges that contact the sensor and the ambient temperature measure for valleys.

Regarding pressure sensors, there are two types of pressure sensing detectors available, which include conductive film detectors and micro electro-mechanical devices (MEMS). Conductive film sensors use a double-layer electrode on flexible films. Accordingly, a user who presses their finger to the flexible films will leave an imprint that is utilized to capture an image of the fingerprint. MEMS sensors use small silicon switches on a silicon chip, such that when a fingerprint ridge touches a switch, it closes and generates an electronic signal. The electronic signals are detected and utilized to create an image of the fingerprint pressed to the MEMS sensor.

Regarding RF sensors, a user's finger is pressed to the sensor, which in turn applies an RF signal to the fingerprint touched to the sensor. The fingerprint reflects a portion of the applied RF signal which is in turn detected by a pixel array of the sensor. The detected signal is utilized to create a fingerprint image of the user's fingerprint.

Regarding ultrasonic sensors, these types of sensor utilized very high frequency sound waves to penetrate an epidermal layer of skin of a user's fingerprint pressed to the sensor. Typically, the sound waves are generated using a piezoelectric transducer, which also functions to receive the sound waves reflected from the user's fingerprint. These reflected sound waves are detected and utilized to create an image of the user's fingerprint.

Biometric image sensors, such as fingerprint sensors, such as the sensor 102, which detect and measure features of the surface of a finger using one or more of optical, capacitive, thermal, pressure, RF and ultrasonic technologies, as discussed above, sometimes fall into one of two categories: (1) placement sensors, and (2) swipe sensors, which are typically smaller than placement sensors. Placement sensors have an active sensing surface that is large enough to accommodate at least a portion of the relevant part of the fingerprint of the finger during a single scan or sensing action. Generally, the placement sensors are rectangular in shape with a sensing surface area that ranges from around 100 mm×100 mm down to 10 mm×10 mm, or in some instances smaller than 10 mm×10 mm. Accordingly, for small size placement sensors, only a portion of the fingerprint will be captured either for immediate use in a recognition process or as part of a fingerprint template for later use in the recognition process. Additionally, in certain embodiments, the placement sensor could have a non-rectangular shape and sensing surface area. Typically, for placement sensors, the finger is held stationary over the sensing surface during a measurement. Generally, during a fingerprint enrollment process, multiple views of the fingerprint image will be captured.

Generally, swipe sensors are smaller in size than placement sensors and require the finger to be moved over the sensor during a measurement. Typically, the finger movement will be either 1D in that the finger moves in a single direction over the sensor surface, or the finger movement can be 2D in that the finger can move in more than one direction over the sensor surface during a measurement. Generally, a fingerprint image captured during a single frame will only be of a portion of a user's fingerprint, and the sensor will capture a series of frames as the user swipes their finger over the sensor so that a larger area of the fingerprint can be captured in a single user input. The larger area may encompass a full fingerprint, or it may still encompass only a partial fingerprint, such as in a swipe sensor having a width less than the full width of the finger.

Turning now to the processing system 104 from FIG. 1, basic functional components of the electronic device 100 utilized during capturing and storing a user fingerprint image are illustrated. The processing system 104 includes a processor 106, a memory 108, a template storage 110 and an operating system (OS) 112 hosting an application suite 114 and a matcher 116. Each of the processor 106, the memory 108, the template storage 110 and the operating system 112 are interconnected physically, communicatively, and/or operatively for inter-component communications.

As illustrated, processor 106 is configured to implement functionality and/or process instructions for execution within electronic device 100 and the processing system 104. For example, processor 106 executes instructions stored in memory 108 or instructions stored on template storage 110. Memory 108, which may be a non-transitory, computer-readable storage medium, is configured to store information within electronic device 100 during operation. In some embodiments, memory 108 includes a temporary memory, an area for information not to be maintained when the electronic device 100 is turned off. Examples of such temporary memory include volatile memories such as random access memories (RAM), dynamic random access memories (DRAM), and static random access memories (SRAM). Memory 108 also maintains program instructions for execution by the processor 106.

Template storage 110 comprises one or more non-transitory computer-readable storage media. The template storage 110 is generally configured to store enrollment views for fingerprint images for a user's fingerprint. The template storage 110 may further be configured for long-term storage of information. In some examples, the template storage 110 includes non-volatile storage elements. Non-limiting examples of non-volatile storage elements include magnetic hard discs, optical discs, floppy discs, flash memories, or forms of electrically programmable memories (EPROM) or electrically erasable and programmable (EEPROM) memories.

The processing system 104 also hosts an operating system 112. The operating system 112 controls operations of the components of the processing system 104. For example, the operating system 112 facilitates the interaction of the processor(s) 106, memory 108, and template storage 110. The operating system 112 further hosts the application suite 114. The application suite 114 contains applications utilizing data stored on the memory 108 or the template storage 110 or data collected from interface devices such as the sensor 102 to cause the processing system 104 to perform certain functions. For instance, in certain embodiments, the application suite 114 hosts an enroller application, which functions to capture one or more views of the user's fingerprint. The views or fingerprint images generally contain a partial or full image of the user's fingerprint, and they may be raw images or feature sets extracted from the raw images. The enrollment application generally instructs the user to hold or swipe their finger across the sensor 102 for capturing the image. After each requested image is captured, the enrollment application typically stores the captured image in the template storage 110. In certain embodiments, the enrollment application will cause the data representing the captured image to undergo further processing. For instance, the further processing may be to compress the data representing the captured image such that it does not take as much memory within the template storage 110 to store the image.

In certain embodiments, the application suite 114 will also contain applications for authenticating a user of the electronic device 100. For example, these applications may be an operating system log-on authentication application, a screen saver authentication application, a folder/file lock authentication application, an application lock and a password vault application. In each of these applications, the individual application may cause the operating system 112 to request the user's fingerprint for an authentication process prior to undertaking a specific action, such as providing access to the operating system 112 during a log-on process for the electronic device 100. To perform this process, the above listed applications will utilize the matcher 116 hosted by the operating system 112.

The matcher 116 of the operating system 112 functions to compare the fingerprint image or images stored in the template storage 110 with a newly acquired fingerprint image or images from a user attempting to access the electronic device 100. In certain embodiments, the matcher 116, or other process, performs image enhancement functions for enhancing a fingerprint image.

In certain embodiments, the matcher 116, or other process, is also configured to perform feature extraction from the fingerprint image or images of the user. During feature extraction, the matcher 116 extracts unique features of the user's fingerprint to derive a verification template used during matching. Various discriminative features may be used for matching, including: minutia matching, ridge matching, ridge flow matching, or some combination thereof. If authentication is performed using minutia features, the matcher 116 scans the captured view of the user's fingerprint for minutia. During extraction, the matcher 116 acquires a location and orientation of the minutia from the fingerprint and compares it to previously captured location and orientation information of minutia from the fingerprint image or images in the template storage 110.

The matcher 116 may compare the verification template associated with an authentication attempts to the enrollment template to compute a composite match score between the templates. If the composite match score satisfies a threshold, the matcher 116 indicates a match. Otherwise, a non-match may be indicated.

While many embodiments of the disclosure are described in the context of a fully functioning apparatus, the mechanisms of the present disclosure are capable of being distributed as a program product (e.g., software) in a variety of forms. For example, the mechanisms of the present disclosure may be implemented and distributed as a software program on information bearing media that are readable by electronic processors (e.g., non-transitory computer-readable and/or recordable/writable information bearing media readable by the processing system 110). Additionally, the embodiments of the present disclosure apply equally regardless of the particular type of medium used to carry out the distribution. Examples of non-transitory, electronically readable media include various discs, memory sticks, memory cards, memory modules, and the like. Electronically readable media may be based on flash, optical, magnetic, holographic, or any other storage technology.

Figure 2:
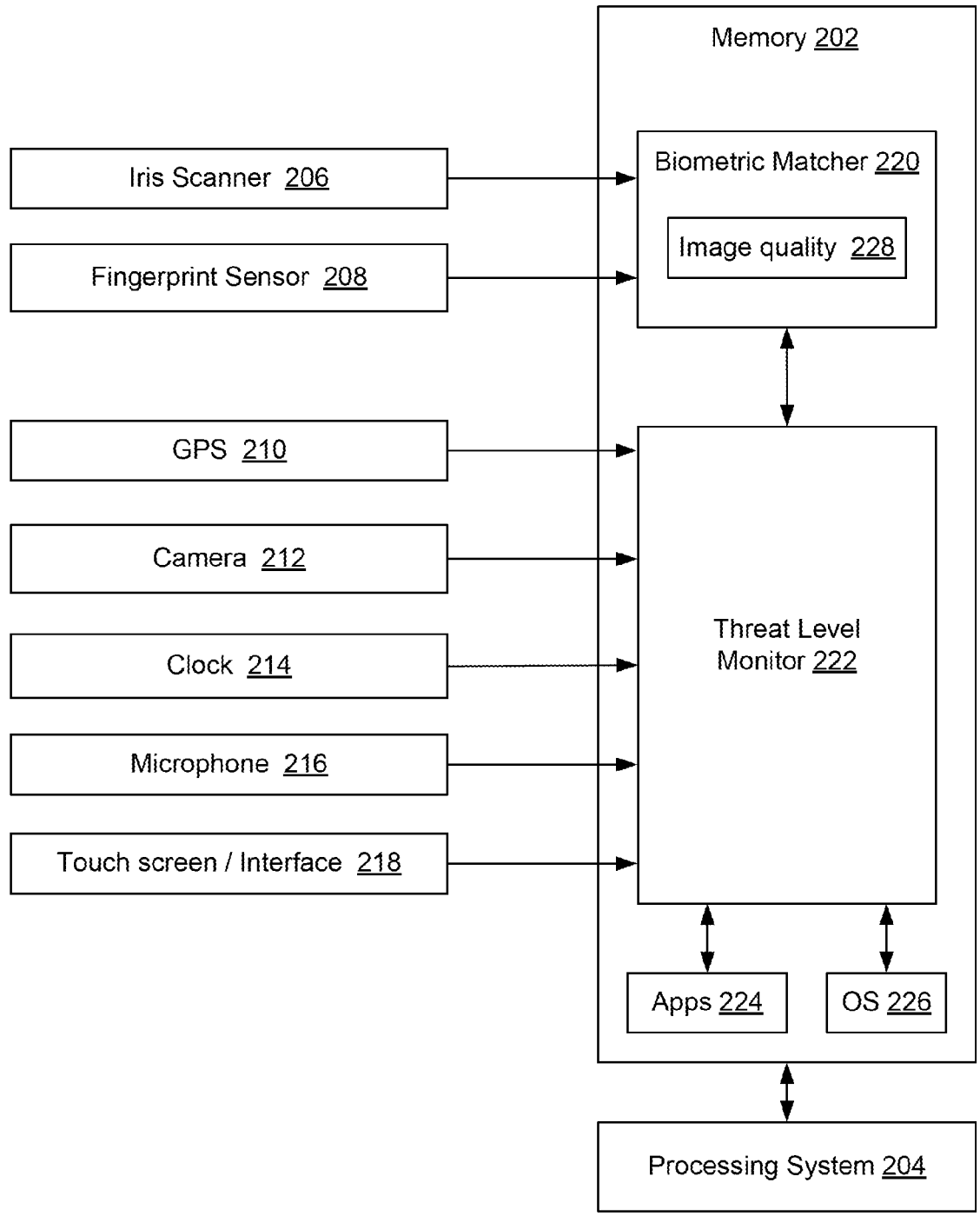
FIG. 2 is a block diagram of a computing device for monitoring a threat level, according to one embodiment of the disclosure.

FIG. 2 is a block diagram of a computing device 200 for monitoring a threat level, according to one embodiment of the disclosure. As shown, the computing device 200 may include various components, including a memory 202, a processing system 204, an iris scanner 206, a fingerprint sensor 208, a GPS unit 210, a camera 212, a clock 214, a microphone 216, and a touch screen or input interface 218. According to various embodiments, certain components in FIG. 2 may be omitted and other components not shown in FIG. 2 may be included in the computing device 200. The various devices shown may be discrete devices or two or more of the devices may be combined into a composite device.

The memory 202 may include various software modules including instructions, where the software modules are executed by the processing system 204. The memory 202 may include a biometric matcher 220, a threat level monitor 222, installed applications 224, and an operating system 226. In some embodiments, the biometric matcher 220 and threat level monitor 222 may be included in the operating system 226. In some embodiments, the installed applications 224 and operating system 226 may be stored in a separate physical memory unit, e.g., a non-volatile storage, other than memory 202. In some embodiments, the biometric matcher 220 may include an image quality module 228.

As described herein, a user first enrolls one or more biometric templates. The biometric templates may be comprised of one or more enrollment views of a biometric, such as a fingerprint or iris, for example.

Each time that the user attempts to authenticate (e.g., via the iris scanner 206 or fingerprint sensor 208), the authentication attempt is assigned a score by the biometric matcher 220. In some authentication schemes, an authentication attempt is compared to the enrolled biometric template and given a score corresponding to how closely the authentication attempt matches the template. If the score satisfies a threshold, the authentication attempt is deemed to be successful and authentication is achieved. If the score does not satisfy the threshold, the authentication attempt is unsuccessful and authentication is denied.

In some embodiments, the value of the threshold may correspond to a certain false accept rate (FAR). For example, an industry standard for security of authentication schemes can set a false accept rate (FAR) to be on the order of 1 in 10,000 attempts to 1 in 100,000 attempts, and preferably at least 1 in 50,000 attempts.

According to various embodiments, the threat level monitor 222 is configured to detect a threat level based on the one or more authentication parameters and one or more device usage parameters, and cause an action to be performed by the device in accordance with the threat level. As described, authentication parameters may include "match parameters" and/or "sample parameters."

To determine the threat level, the threat level monitor 222 may take into account match parameters received from the biometric matcher 220. The match parameters may be associated with a correlation between data corresponding the authentication attempt and the biometric template. The threat level monitor 222 may further take into account sample parameters associated with the data corresponding to the attempt. For example, the image quality module 228 may be configured to detect a measure of image quality of the data, a measure of moistness corresponding to the data, and/or an indication of whether a full or partial image of the biometric was captured. Further, the threat level monitor 222 may take into account device usage parameters either at the time of the authentication attempt or within a time window after the authentication attempt. The device usage parameters may be received from one or more of the GPS unit 210, the camera 212, the clock 214, the microphone 216, the touch screen or input interface 218, the installed applications 224, and/or the operating system 226.

The one or more authentication parameters and the one or more device usage parameters received by the threat level monitor 222 can be aggregated and compared to stored usage patterns. For example, the threat level monitor 222 may analyze the one or more authentication parameters and one or more device usage parameters relative to a data model. Each parameter of the data model may be assigned a weight factor to indicate how strong of a correlation/pattern is exhibited by the particular parameter. Other techniques for comparing the one or more authentication parameters and one or more device usage parameters to known patterns are also within the scope of the disclosure.

In some embodiments, the threat level can be determined to be high or low. If the threat level is high, certain actions can be initiated in the computing device 200 by the threat level monitor 222, such as locking the computing device, limiting access to only certain applications on the computing device 200 (e.g., allowing access to web browser application, but not allowing access to phone or messaging application), issuing a system level or application level alert, encrypting certain data, deleting all content of the device, increasing system security setting (e.g., FAR/FRR levels), etc. If the threat level is determined to be low, certain actions can be initiated in the computing device 200 by the threat level monitor 222, such as decreasing the system security setting (e.g., FAR/FRR levels).

Figure 3:
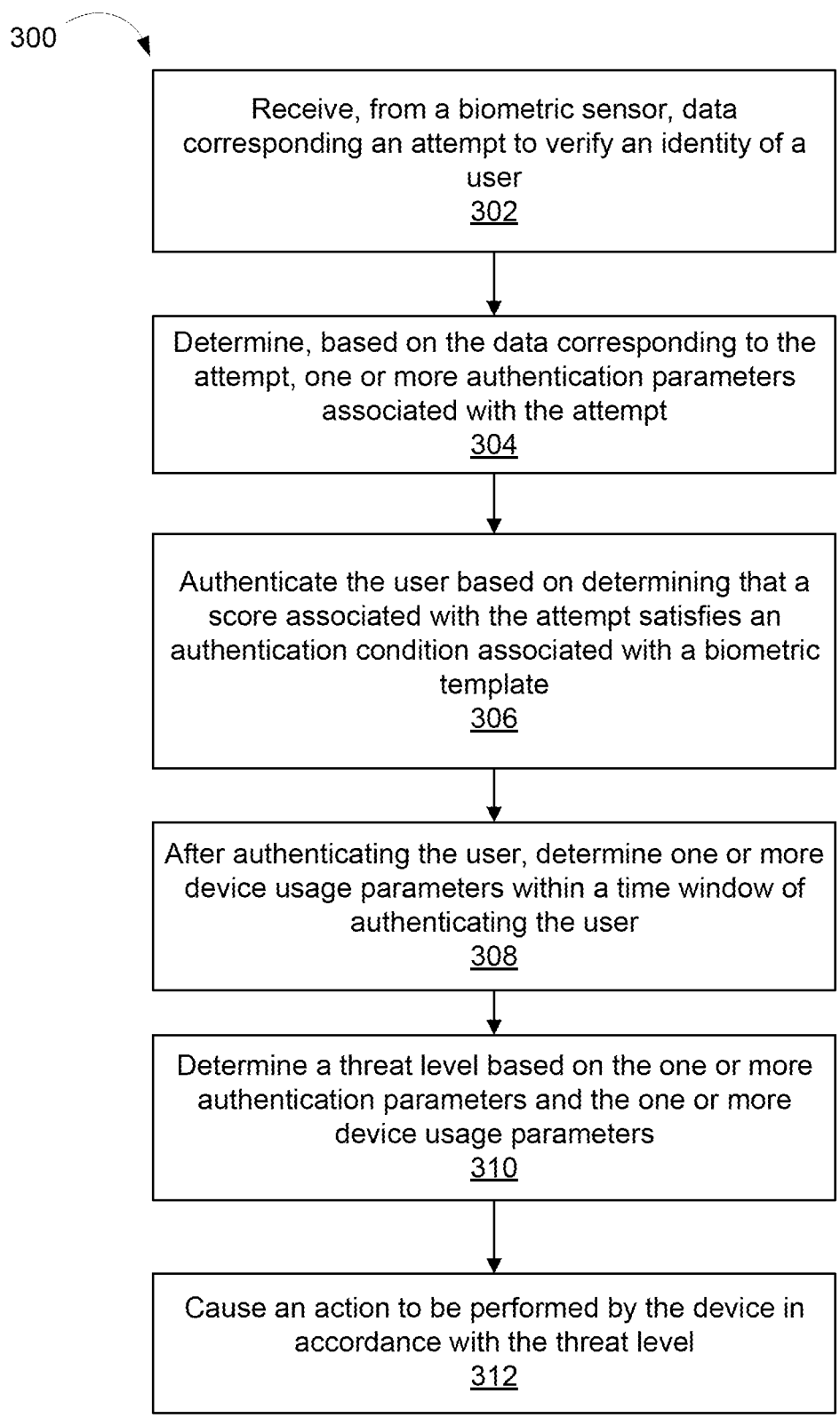
FIG. 3 is a flow diagram of a method for determining a threat level of a computing system, according to one embodiment of the disclosure.

FIG. 3 is a flow diagram of a method for determining a threat level of a computing system, according to one embodiment of the disclosure. As shown, the method 300 begins at step 302, where a threat level monitor module executed by a processing system, receives, from a biometric sensor, data corresponding an attempt to verify an identity of a user. In some implementations, the processing system comprises processing system 110 in FIG. 1 or processing system 204 in FIG. 2. Although the method 300 is described in the context of biometric authentication (for example, fingerprint authentication) other embodiments may not involve biometrics and can be used in any authentication scheme in which authentication can be successful even if the authentication attempt does not perfectly match a template. According to various embodiments, the biometric sensor may be a fingerprint sensor or a sensor (such as a camera) configured to perform facial or other physical recognition. In other embodiments, the biometric sensor may be configured to accept gestures, such that the user is requested to perform a gesture to authenticate.

At step 304, the threat level monitor determines, based on the data corresponding to the attempt, one or more authentication parameters associated with the attempt. As described, authentication parameters may include "match parameters" and/or "sample parameters." Match parameters may be associated with a correlation between data corresponding the authentication attempt and one or more biometric templates. Sample parameters may be associated with the data corresponding to the authentication attempt itself.

At step 306, the threat level monitor authenticates the user based on determining that a score associated with the attempt satisfies an authentication condition associated with a biometric template. At step 308, after authenticating the user, the threat level monitor determines one or more device usage parameters within a time window of authenticating the user.

At step 310, the threat level monitor determines a threat level based on the one or more authentication parameters and the one or more device usage parameters. In some embodiments, determining the threat level is based on analyzing the one or more authentication parameters and the one or more device usage parameters relative to a data model. At step 312, the threat level monitor causes an action to be performed by the device in accordance with the threat level.

Figure 4:
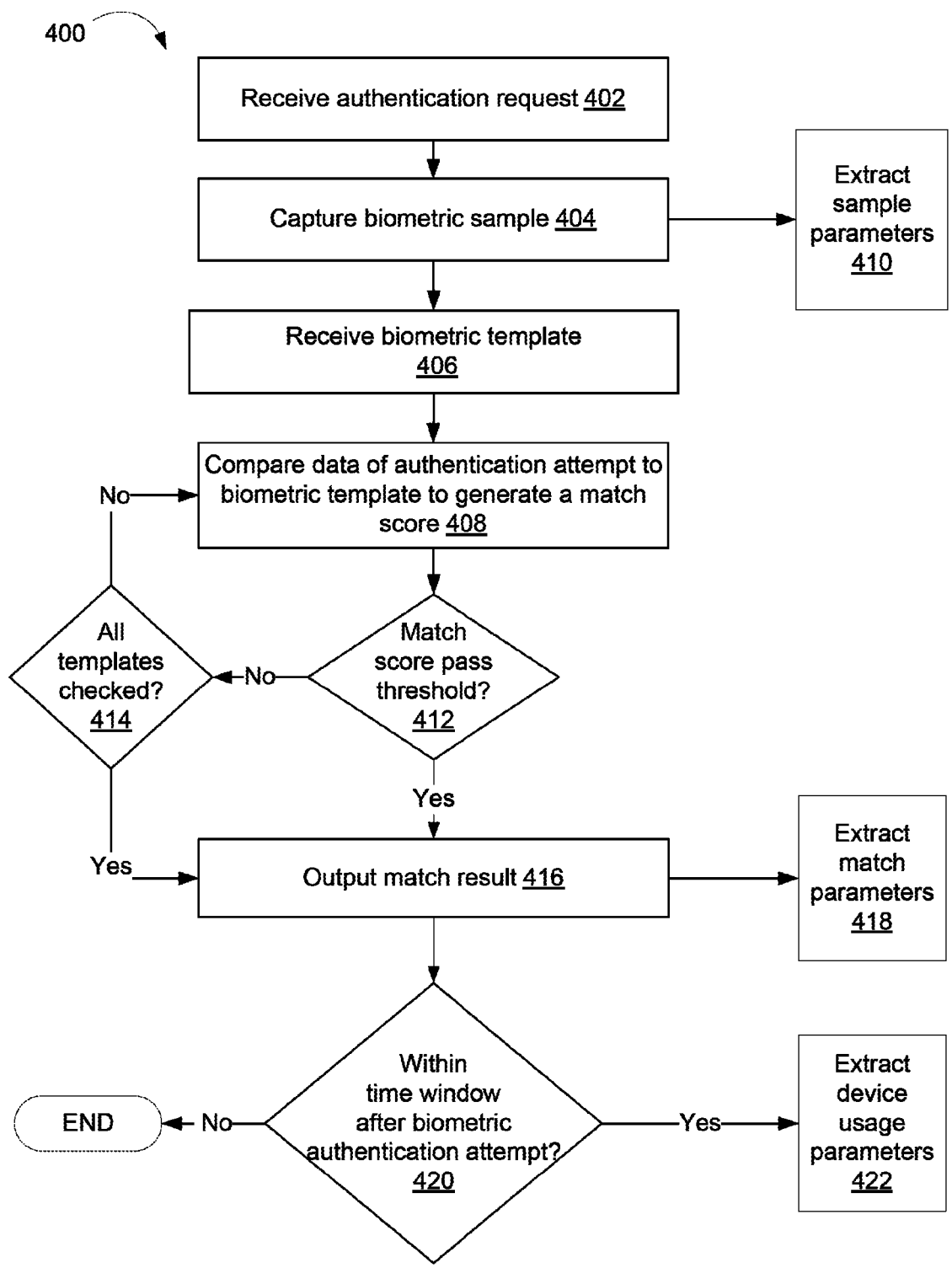
FIG. 4 is a flow diagram of a method for extracting sample parameters, match parameters, and device usage parameters in an authentication system, according to one embodiment of the disclosure.

FIG. 4 is a flow diagram of a method for extracting sample parameters, match parameters, and device usage parameters in an authentication system, according to one embodiment of the disclosure. As shown, the method 400 begins at step 402, where a processing system executing a software module receives an authentication request. At step 404, the processing system captures a biometric sample using a biometric sensor, such as a fingerprint sensor. At step 410, the processing system extracts sample parameters. Sample parameters may be associated with the data corresponding to the authentication attempt itself. The sample parameters can be extracted from multiple biometric samples, such as from authentication attempts.

At step 406, the processing system receives a biometric template to which the biometric sample is to be compared. The biometric template is stored in a memory or storage device. In some embodiments, multiple biometric samples are captured during the enrollment process and these separate "enrollment views" can be combined to form the biometric template.

At step 408, in response to an authentication attempt, the processing system compares data of the authentication attempt to the biometric template to generate a match score. At step 412, the processing system determines whether the match score passes a threshold. If the match score passes the threshold, the method proceeds to step 416. If the score does not pass the threshold, then the method 400 proceeds to step 414, where the processing system determines whether all templates have been checked. In some embodiments, different templates can be created for different fingers or for different users, e.g., different family members. If the processing system determines that not all templates have been checked, then the method returns to step 408. If the processing system determines that all templates have been checked, then the method proceeds to step 416.

At step 416, the processing system outputs the match result. The match result can either be successful or unsuccessful. At step 418, the processing system extracts match parameters. Match parameters may be associated with a correlation between the data corresponding the attempt and one or more biometric templates.

From step 416, the method proceeds to step 420, where the processing system determines whether a given time is within a time window after the biometric authentication attempt. If yes, at step 422, the processing system extracts device usage parameters. As described, the device usage parameters may be received from one or more of the GPS unit 210, the camera 212, the clock 214, the microphone 216, the touch screen or input interface 218, the installed applications 224, and/or the operating system 226, as shown in FIG. 2.

Figure 5:
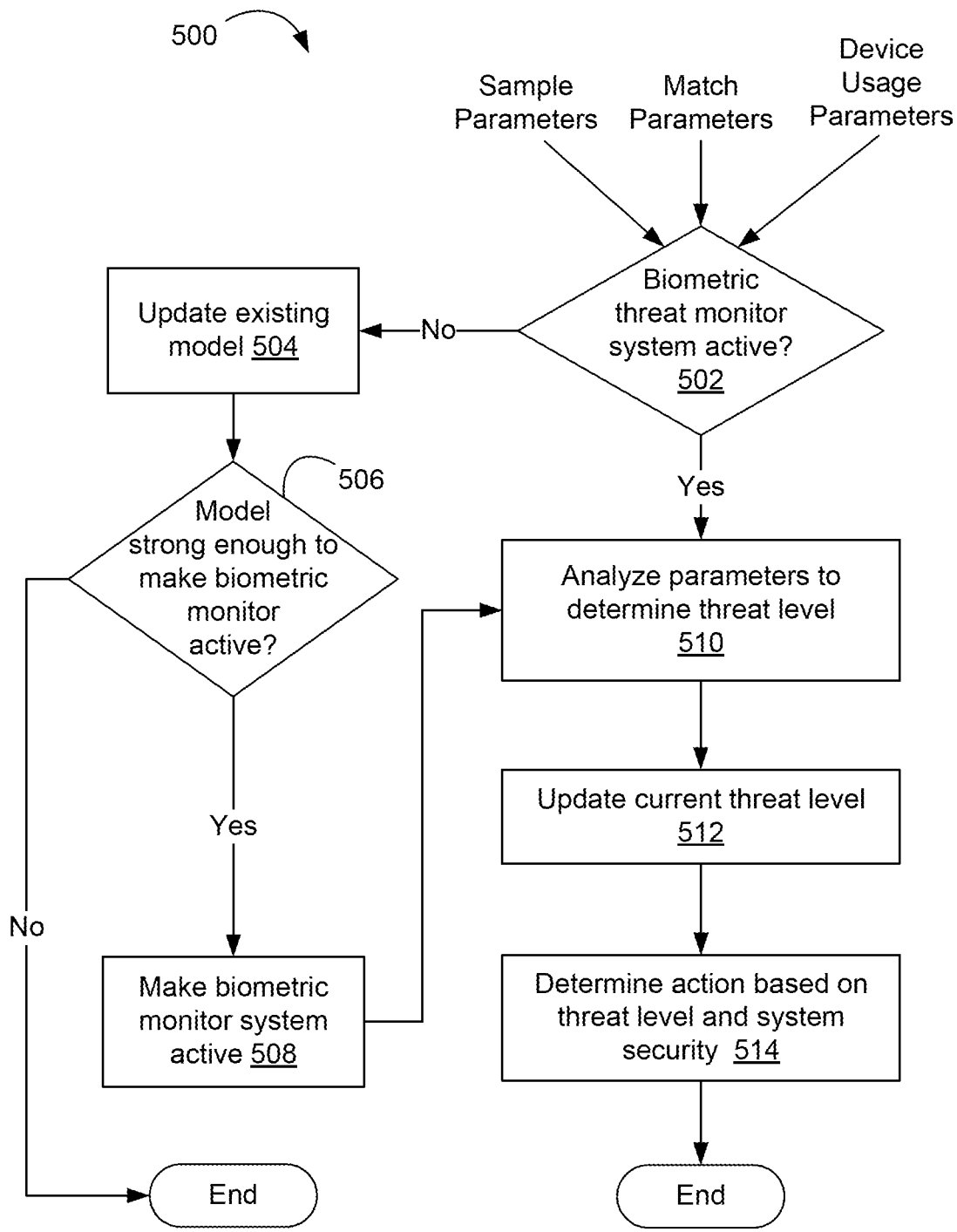
FIG. 5 is a flow diagram of a method for monitoring a threat level, according to one embodiment of the disclosure.

FIG. 5 is a flow diagram of method steps for monitoring a threat level, according to one embodiment of the disclosure. In one embodiment, the sample parameters, match parameters, and device usage parameters extracted using the method of FIG. 4 are input to a processing unit executing a software module. At step 502, the processing system determines whether a biometric threat monitor system is active.

In some embodiments, when a sufficient number of patterns are detected, the status of the biometric monitor goes from "idle" mode to "active" mode. In some implementations, the system security setting cannot be altered when the biometric system monitor software is in idle mode, as the threat level cannot be reliably determined. In some embodiments, when the biometric system monitor software is in active mode, threat level starts with a median level and increases every time a pattern is missed. For example, if a strong pattern of authenticating the phone and calling 'Mom' occurs at around 6 pm every day, a missed event is triggered by the biometric monitor when such an activity is not detected. Depending on the weight of the missed patterns, the threat level is raised. An occurrence of an event consistent with a known pattern lowers the threat level based on the weight of the pattern. Several missed patterns or actions outside the normal patterns of activity can increase the threat level and the associated actions of increasing FAR/FRR, etc. can be taken.

If, at step 502 the processing system determines that the biometric threat monitor system is not active, then the method 500 proceeds to step 504. At step 504, the processing system updates an existing model. At step 506, the processing system determines whether the model is strong enough to make the biometric threat monitor system active. If no, the method 500 terminates. If yes, at step 508, the processing system makes the biometric threat monitor system active, and the method 500 proceeds to step 510.

If, at step 502 the processing system determines that the biometric threat monitor system is active, then the method 500 proceeds to step 510. At step 510, the processing system analyzes the sample parameters, match parameters, and device usage parameters extracted using the method of FIG. 4 to determine a threat level. For example, the threat level can be high or low. At step 512, the processing system updates the current threat level. At step 514, the processing system determines action based on the current threat level and a system security setting. In one implementation, the action may be to adjust the system security level.

In some embodiments, if several patterns are frequently detected, the biometric system monitor software can lower the threat level and can choose to lower the FAR/FAR threshold such that the user can continue to experience a smooth user experience. As more confirmation is received to believe that the user/system has not been compromised, the system can continue to operate at lower security setting to allow for a more convenient use of the biometric sensor without a tradeoff in security.

Advantageously, embodiments of the disclosure provide a system and method that use authentication patterns to determine a system threat level of a system, and improve the biometric authentication experience with the use of a biometric threat monitor. For example, if the threat level is low, usability may be improved, e.g., by providing easier authentication. If the threat level is high, system security may be increased to protect the user from fraud or other malicious action.

For situations in which the systems discussed here collect personal information about users or user's devices, the users may be provided with an opportunity to control whether programs or features collect personal information (e.g., a user's preferences, or a device's current location). In addition, certain data may be anonymized in one or more ways before it is stored or used, so that personally identifiable information is removed. For example, a user's identity may be anonymized so that no personally identifiable information can be determined for the user, or a user's geographic location may be generalized where location information is obtained (such as, for example, to a city, ZIP code, or state level), so that a particular location of a user cannot be determined. Thus, the user may have control over how information is collected about him or her and used by the systems discussed herein.

The embodiments and examples set forth herein were presented in order to best explain the present disclosure and its particular application and to thereby enable those skilled in the art to make and use the invention. However, those skilled in the art will recognize that the foregoing description and examples have been presented for the purposes of illustration and example only. The description as set forth is not intended to be exhaustive or to limit the invention to the precise form disclosed.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A device for determining a threat level, comprising:
   a biometric sensor; and
   a processing system configured to:
      receive, from the biometric sensor, data corresponding an attempt to verify an identity of a user;
      determine, based on the data corresponding to the attempt, one or more authentication parameters associated with the attempt;
      authenticate the user based on determining that a score associated with the attempt satisfies an authentication condition associated with a biometric template, wherein the authentication condition comprises a threshold value, and authenticating the user is based on determining that the score associated with the attempt satisfies the threshold value;
      after authenticating the user, determine one or more device usage parameters within a time window of authenticating the user;

determine a threat level based on the one or more authentication parameters and the one or more device usage parameters;

cause an action to be performed by the device based on the threat level, wherein the action comprises raising or lowering the threshold value associated with the authentication condition to an updated threshold value based on the threat level;

receive, from the biometric sensor, data corresponding a subsequent attempt to verify the identity of the user; and authenticate the user based on determining that a score associated with the subsequent attempt satisfies the updated threshold value.

2. The device of claim 1, wherein the one or more authentication parameters include one or more match parameters associated with a correlation between the data corresponding to the attempt and the biometric template.

3. The device of claim 2, wherein the one or more match parameters include at least one of:
a measure of coverage between the data and the biometric template;
an indication of whether one or more minutiae points are included in the data corresponding the attempt;
a measure of alignment between the data and the biometric template;
an indication of which iris was used to authenticate the user;
an indication of which finger was used to authenticate the user; and
an indication of localization information for the data.

4. The device of claim 3, wherein the indication of localization information comprises one or more of:
an indication of which enrollment view of the biometric template was used to authenticate the user;
an indication of a location within a particular enrollment view that is associated with the authentication attempt; and
an indication of whether a core of a finger is included in the data.

5. The device of claim 1, wherein the one or more authentication parameters include one or more sample parameters associated with the data corresponding to the attempt.

6. The device of claim 5, wherein the one or more sample parameters include at least one of:
a measure of image quality of the data;
a measure of moistness corresponding to the data; and
an indication of whether a full or partial image of the biometric was captured.

7. The device of claim 1, wherein the one or more device usage parameters include at least one of:
a time of day associated with the attempt to verify the identity of the user;
a geographic location associated with the attempt to verify the identity of the user;
data corresponding to which one or more programs are opened on the device within a time window after authenticating the user;
data corresponding to one or more gestures made on the device within a time window after authenticating the user;
data corresponding to which parts of a screen were touched on the device within a time window after authenticating the user; and data corresponding to ambient sounds detected by the device within a time window after authenticating the user.

8. The device of claim 1, wherein in response to determining the threat level to be high, causing the action to be performed includes at least one of:
causing a system alert or an application alert to be initiated;
causing one or more programs of the device to become deactivated;
causing one or more files stored on the device to become encrypted;
causing one or more files stored on the device to become deleted; and
causing a payment system to become deactivated.

9. The device of claim 1, wherein the processing system is further configured to:
determine the threat level based on analyzing the one or more authentication parameters and the one or more device usage parameters relative to a data model.

10. The device of claim 9, wherein the processing system is configured to generate the data model based on prior authentication attempts of the user and prior device usage by the user after prior authentication.

11. The device of claim 1, wherein the biometric template comprises a template of a fingerprint of the user.

12. The device of claim 1, wherein the action comprises raising the threshold value associated with the authentication condition, resulting in a lower false acceptance rate (FAR) for authentication.

13. The device of claim 1, wherein the action comprises lowering the threshold value associated with the authentication condition, resulting in a higher false acceptance rate (FAR) for authentication.

14. A method for determining a threat level, comprising:
receiving, from a biometric sensor, data corresponding an attempt to verify an identity of a user;
determining, based on the data corresponding to the attempt, one or more authentication parameters associated with the attempt;
authenticating the user based on determining that a score associated with the attempt satisfies an authentication condition associated with a biometric template, wherein the authentication condition comprises a threshold value, and authenticating the user is based on determining that the score associated with the attempt satisfies the threshold value;
after authenticating the user, determining one or more device usage parameters within a time window of authenticating the user;
determining a threat level based on the one or more authentication parameters and the one or more device usage parameters;
causing an action to be performed by the device based on the threat level, wherein the action comprises raising or lowering the threshold value associated with the authentication condition to an updated threshold value based on the threat level;
receiving, from the biometric sensor, data corresponding a subsequent attempt to verify the identity of the user; and
authenticating the user based on determining that a score associated with the subsequent attempt satisfies the updated threshold value.

15. The method of claim 14, wherein the one or more authentication parameters include one or more match parameters associated with a correlation between the data corresponding to the attempt and the biometric template.

16. The method of claim 15, wherein the one or more match parameters include at least one of:
- a measure of coverage between the data and the biometric template;
- an indication of whether one or more minutiae points are included in the data corresponding the attempt;
- a measure of alignment between the data and the biometric template;
- an indication of which iris was used to authenticate the user;
- an indication of which finger was used to authenticate the user; and
- an indication of localization information for the data.

17. The method of claim 16, wherein the indication of localization information comprises one or more of:
- an indication of which enrollment view of the biometric template was used to authenticate the user;
- an indication of a location within a particular enrollment view that is associated with the authentication attempt; and
- an indication of whether a core of a finger is included in the data.

18. The method of claim 14, wherein the one or more authentication parameters include one or more sample parameters associated with the data corresponding to the attempt.

19. The method of claim 18, wherein the one or more sample parameters include at least one of:
- a measure of image quality of the data;
- a measure of moistness corresponding to the data; and
- an indication of whether a full or partial image of the biometric was captured.

20. The method of claim 14, wherein the one or more device usage parameters include at least one of:
- a time of day associated with the attempt to verify the identity of the user;
- a geographic location associated with the attempt to verify the identity of the user;
- data corresponding to which one or more programs are opened on the device within a time window after authenticating the user;
- data corresponding to one or more gestures made on the device within a time window after authenticating the user;
- data corresponding to which parts of a screen were touched on the device within a time window after authenticating the user; and
- data corresponding to ambient sounds detected by the device within a time window after authenticating the user.

21. A non-transitory computer-readable storage medium storing instructions that, when executed by a processor, causes a computing device to determine a threat level, by performing steps comprising:
- receiving, from a biometric sensor, data corresponding an attempt to verify an identity of a user;
- determining, based on the data corresponding to the attempt, one or more authentication parameters associated with the attempt;
- authenticating the user based on determining that a score associated with the attempt satisfies an authentication condition associated with a biometric template, wherein the authentication condition comprises a threshold value, and authenticating the user is based on determining that the score associated with the attempt satisfies the threshold value;
- after authenticating the user, determining one or more device usage parameters within a time window of authenticating the user;
- determining a threat level based on the one or more authentication parameters and the one or more device usage parameters;
- causing an action to be performed by the device based on the threat level, wherein the action comprises raising or lowering the threshold value associated with the authentication condition to an updated threshold value based on the threat level;
- receiving, from the biometric sensor, data corresponding a subsequent attempt to verify the identity of the user; and
- authenticating the user based on determining that a score associated with the subsequent attempt satisfies the updated threshold value.

* * * * *